US010505204B2

(12) United States Patent
Deska et al.

(10) Patent No.: US 10,505,204 B2
(45) Date of Patent: Dec. 10, 2019

(54) BATTERY WITH TEMPERATURE CONTROL IN CERTAIN REGIONS

(71) Applicant: Robert Bosch GmbH, Stuttgart (DE)

(72) Inventors: David Deska, Ludwigsburg (DE); Andreas Wohlfarth, Stuttgart (DE); Johannes Schneider, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 15/815,233

(22) Filed: Nov. 16, 2017

(65) Prior Publication Data

US 2018/0145340 A1 May 24, 2018

(30) Foreign Application Priority Data

Nov. 18, 2016 (DE) .................. 10 2016 222 796

(51) Int. Cl.
| | |
|---|---|
| *H01M 6/50* | (2006.01) |
| *H01M 10/42* | (2006.01) |
| *H01M 10/63* | (2014.01) |
| *H01M 10/625* | (2014.01) |
| *B60L 58/27* | (2019.01) |
| *H01M 10/613* | (2014.01) |
| *H01M 2/02* | (2006.01) |
| *H01M 2/10* | (2006.01) |
| *H01M 8/2425* | (2016.01) |

(Continued)

(52) U.S. Cl.
CPC .......... *H01M 6/5038* (2013.01); *B60L 58/27* (2019.02); *H01M 2/024* (2013.01); *H01M 2/0262* (2013.01); *H01M 2/1077* (2013.01); *H01M 8/2425* (2013.01); *H01M 10/0413* (2013.01); *H01M 10/4207* (2013.01); *H01M 10/443* (2013.01); *H01M 10/613* (2015.04); *H01M 10/625* (2015.04); *H01M 10/63* (2015.04); *B60L 50/64* (2019.02); *H01M 2/1072* (2013.01); *H01M 2220/20* (2013.01)

(58) Field of Classification Search
CPC ............. H01M 6/5038; H01M 10/613; H01M 2/1077; H01M 8/2425; H01M 10/443; H01M 10/63; H01M 10/615; B60L 58/27
See application file for complete search history.

(56) References Cited

U.S. PATENT DOCUMENTS

| | | |
|---|---|---|
| 2012/0295142 A1 | 11/2012 | Yan et al. |
| 2014/0227568 A1 | 8/2014 | Hermann |

(Continued)

FOREIGN PATENT DOCUMENTS

| | | |
|---|---|---|
| DE | 102009046567 | 5/2011 |
| DE | 102012022553 | 8/2013 |

*Primary Examiner* — Stewart A Fraser
(74) *Attorney, Agent, or Firm* — Michael Best & Friedrich LLP

(57) ABSTRACT

A battery module (10) having a multiplicity of battery cells (11), in particular solid electrolyte cells, a battery management system (12) for performing open-loop and/or closed-loop control of the battery cells (11). The battery cells (11) are combined in sections (13) which form a heating region (14) and have at least one associated heating element (15), wherein the heating element (15) can be open-loop and/or closed-loop controlled by the battery management system (12) in such a way that temperature control of the sections (13) can be implemented in certain regions by the respective heating element (15).

19 Claims, 3 Drawing Sheets

(51) Int. Cl.
*H01M 10/04* (2006.01)
*H01M 10/44* (2006.01)
*B60L 50/64* (2019.01)

(56) References Cited

U.S. PATENT DOCUMENTS

| | | | |
|---|---|---|---|
| 2014/0356652 A1* | 12/2014 | Boddakayala | H01M 2/1077 429/50 |
| 2015/0200427 A1* | 7/2015 | Haskins | H01M 10/486 429/62 |
| 2017/0052229 A1* | 2/2017 | Eckert | H01M 10/48 |
| 2017/0200969 A1* | 7/2017 | Musick | H01M 10/02 |

\* cited by examiner

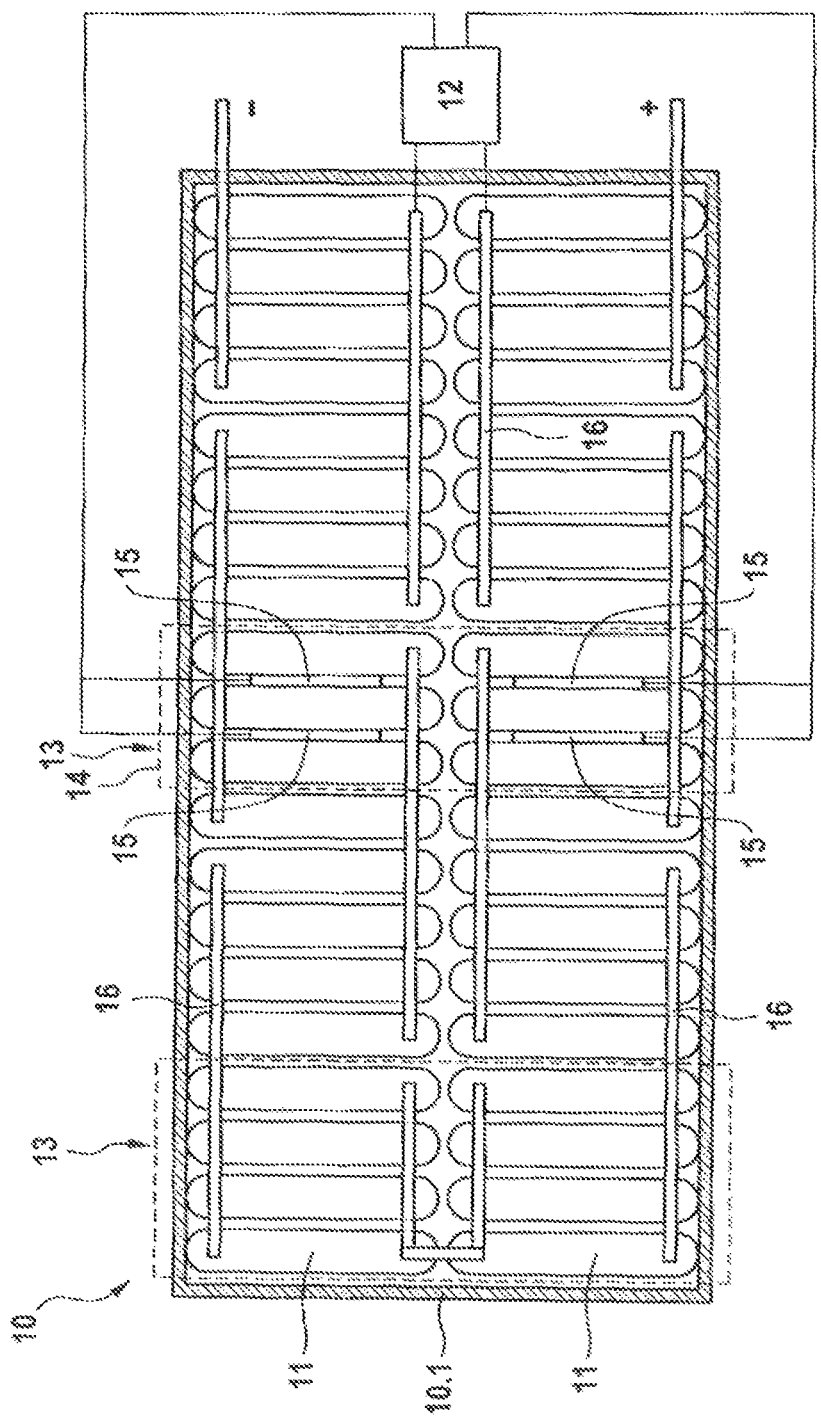

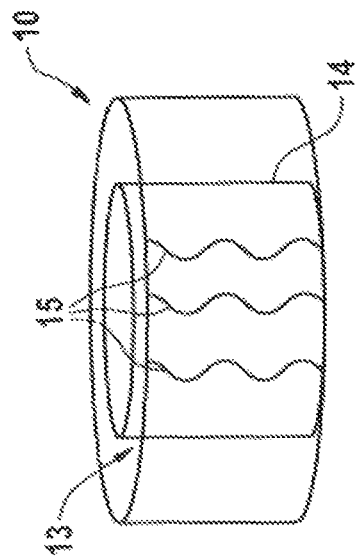
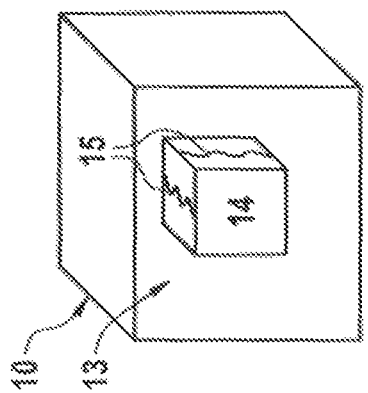
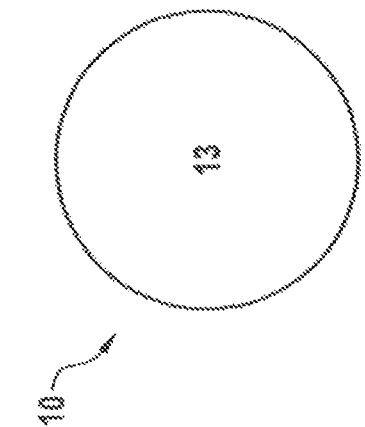
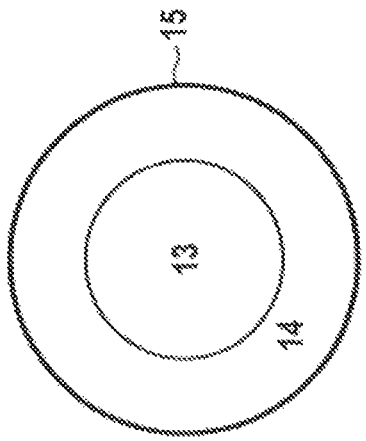
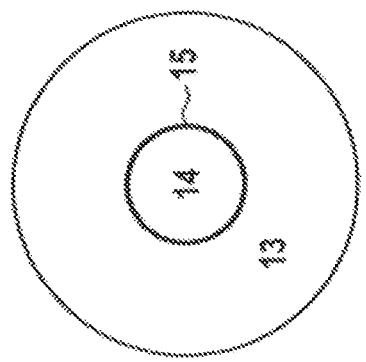
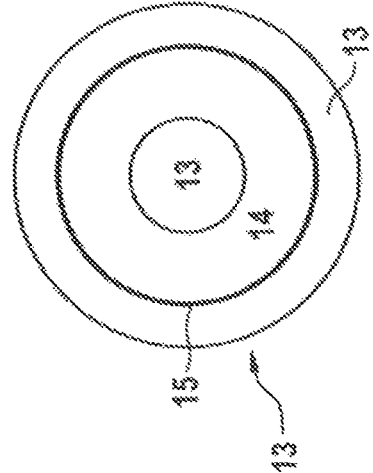

BATTERY WITH TEMPERATURE CONTROL IN CERTAIN REGIONS

BACKGROUND OF THE INVENTION

The present invention relates to a battery module having a multiplicity of battery cells, in particular solid electrolyte cells, and a battery management system for performing open-loop and/or closed-loop control of the battery cells, a battery having a plurality of battery modules, and a method for performing temperature control of a battery.

Electrical storage units which are operated at a raised temperature (i.e. above room temperature) are known. Advantages of such batteries can relate, for example, to the costs, the specific energy contents or also safety. Reasons for the raised temperature level are usually to permit sufficiently large conductivity levels and the storage capacity of the cell components involved and to permit sufficiently large exchange current densities in association with the electrochemical cell reactions which are involved. Energy storage units of the generic type must, under certain circumstances, be heated during operation or when activation occurs. Correspondingly, energy storage systems which only reach their optimum efficiency at raised temperatures require energy for heating the storage unit, e.g. when the vehicle starts. Furthermore, it is possible that during downtimes of the storage units without operation or only with restricted operation, energy is always required for heating in order to be prepared for further operation of the battery. This consumes energy and can, under certain circumstances, run down the battery. A method for heating a battery of a motor vehicle is disclosed e.g. in DE 10 2012 022 553 A1, in which a method for heating a battery of a motor vehicle by means of a discharge current and a coupling of the battery to at least one electrical current sink causes the battery to heat up via the latter.

SUMMARY OF THE INVENTION

According to the invention, a battery module having a multiplicity of battery cells, in particular solid electrolyte cells and a battery management system for performing open-loop and/or closed-loop control of the battery cells, a battery for a vehicle which can at least be driven electrically having a multiplicity of battery modules according to the invention and a method for performing temperature control of a battery according to the invention are now proposed.

Further features and details of the invention can be found in the claims, the description and the drawings. In this context, features and details which have been described in relation to the battery module according to the invention, also apply, of course, in relation to the battery according to the invention and/or the method according to the invention, and respectively vice versa, with the result that reference is always made, and can always be made, to the individual aspects of the invention in the disclosure in a reciprocal fashion.

According to the invention, the battery module is characterized in that the battery cells are combined in sections which form a heating region and have at least one associated heating element, wherein the heating element can be open-loop and/or closed-loop controlled by the battery management system in such a way that temperature control of the section can be implemented in certain regions by the respective heating element. The battery cells can be combined here mechanically, in particular geometrically and electrically into sections which form a heating region, wherein at least one heating element is assigned to the sections. Correspondingly, battery cells of one section can be connected to one another mechanically and/or arranged geometrically in a module housing in such a way that they form a heating region and are separated mechanically, geometrically and/or electrically from other sections. The heating element is open-loop and/or closed-loop controlled according to the invention by the battery management system in such a way that the battery cells of the sections can be correspondingly temperature controlled depending on the desired temperature level and the operating strategy. It is conceivable here that, for example in a restricted operating mode (e.g. in the case of a parked vehicle), only a single section or selected sections is/are temperature-controlled by the heating element, with the result that heating regions with a defined number of battery cells are formed. The sections can vary here in the number of battery cells. Within the scope of the invention, temperature control can be understood to mean both heating and cooling. It is therefore conceivable for the heating element to make possible a heating function, a heat-maintaining function and/or a cooling function. It is therefore possible for the heating element to be embodied, for example, in such a way that thermal energy can be conducted away via such a heating element. However, it is preferred that the heating element feeds thermal energy to the battery cells in the heating region, in order to be prepared for the further operation of the battery modules. Rapid use of the battery modules, e.g. for the driving mode, can be implemented by the section-wise temperature control of the battery cells. At the same time, a lower expenditure of energy is necessary in order to permit pre-heating of the battery modules. This can result in a larger range of the battery modules and therefore of the vehicle. The heating element can be operated passively and/or actively within the scope of the invention. A heating element of passive design permits temperature control of the sections in certain regions, by virtue of the fact that, for example, energy for charging the battery cells brings about heating of the respective battery cells, and the heating element stores and/or can pass on the thermal energy which is generated as a result. The thermal energy of the charging battery cells can therefore be transmitted to battery cells of further sections.

The battery cells of the individual sections can advantageously be conductively connected to one another via high-current-conducting connecting elements, as a result of which energy for performing temperature control and/or for the heating element can be transmitted. It is therefore possible for electrical and/or thermal energy for performing the temperature control of the battery cells to be transmitted via the high-current-conducting connecting elements, with the result that the respective heating regions can be correspondingly temperature-controlled. A heating element according to the invention can be embodied here, for example, as a heating film, a heating wire and/or a temperature control plate. The heating elements can be arranged here on or else in at least one battery cell of a section, preferably on a plurality of battery cells of a section. Moreover, it is conceivable for a heating element to be arranged on at least one side of a battery cell, in particular the battery cell housing. Furthermore, the heating elements can extend, at least partially, along a plurality of battery cells, or all the battery cells, of one section. A heating film permits here surface temperature control of the battery cells and/or of the sections. The temperature control plate also permits surface temperature control of the battery cells or of the sections, with the result that individual heating regions can be formed by means of the temperature control plates. A heating wire permits rapid heating in partial regions of the battery cells. The electrical energy of the battery cells can therefore be transmitted via the high-current-conducting connecting elements to charge and/or to supply electricity to an external consumer. It is conceivable that electrical energy is transmitted via the high-current-conducting connecting elements for charging the battery cells of the individual sections, with the result that the battery cells of the individual sections can heat up and form a heating region. An associated heating element can serve here to store and/or transmit the thermal energy, as a result of which more rapid heating of the battery cells in the heating region is made possible, or the thermal energy for heating adjacent sections can be transmitted. Moreover, it is conceivable that a fluid for transmitting heat can also be conducted via the high-current-conducting connecting elements. The fluid can already be heated here or can be heated by the thermal energy during the charging and/or discharging of the battery cells. This makes it possible for the battery cells of the individual sections to be temperature-controlled uniformly, as a result of which more rapid use of the battery modules can be made possible. Accordingly, redistribution of the thermal energy within the battery module can be made possible by the heating regions which are formed.

Within the scope of the invention, the number of the battery cells of the section can be different from one another, in particular can be switched in a variable fashion. This can preferably be carried out by means of a battery management system, with the result that battery cells can be switched on or off depending on the temperature level and required operating strategy. Therefore, the size of the sections can be embodied differently, in particular can be switched in variable fashion. Accordingly, heating areas of different sizes can be produced by virtue of the fact that the number and/or the size of the heating elements in the sections can be configured differently. This gives rise to a lower expenditure of energy for pre-heating the battery cells and therefore the battery module. It is conceivable here that during operation or when the battery modules are activated, sections with a relatively small number of battery cells, in particular sections with a relatively small surface, are first connected together and/or temperature-controlled by means of heating elements, with the result that firstly heating regions with a relatively small surface are formed, which heating regions can be temperature-controlled with less expenditure of energy. Therefore, the temperature-controlled heating regions can be used more quickly or make available a correspondingly increased power level. Sections with a relatively large number of battery cells are also successively connected, wherein further sections can be temperature-controlled by the heating region with the previous smaller dimensions. It is therefore possible for a heating process/heating mode to be produced in which first a relatively small number of battery cells are temperature-controlled and subsequently a relatively large number of battery cells are temperature-controlled by the heating regions which are made smaller.

It is advantageous if the heating region is embodied in a conical, right-parallelepiped-shaped or cylindrical shape. The sections of the battery cells are therefore combined geometrically, mechanically and/or electrically with the respective heating elements to form a heating region in such a way that an essentially conical, right-parallelepiped-shaped or cylindrical shape configuration of the heating regions is produced. The heating regions can be arranged adjacent to one another here or offset with respect to one another in the battery module. It is advantageous if, given a multiplicity of heating regions, said heating regions are given dimensions of different sizes. In this context, the number of the battery cells of a heating region and/or the geometry of the battery cells can differ in size. It is conceivable that the heating regions overlap or are arranged one in the other at least partially. Given a conical geometry, a first heating region can therefore be surrounded by at least one shell-shaped heating region. Analogously to this, a heating region which is embodied in a cylindrical shape can be surrounded by a further cylindrical heating region with a relatively large number of battery cells. It is also conceivable for, in particular, right-parallelepiped-shaped heating regions to be embodied adjacent to one another, and therefore for them to be able to additionally temperature-control the adjacent sections.

Within the scope of the invention, at least one inner heating region and at least one outer heating region can be provided. This results in a core operating mode and a peripheral operating mode, wherein the inner heating region can form the core operating mode, and at least one outer heating region can form the peripheral operating mode of the battery module. It is preferred here that in a first step of the heating mode a core operating mode is formed with a small number of battery cells of the sections and an associated heating element. In a further step, a second heating region can form around the core section of the first heating region, which second heating region extends, for example, with a cylindrical shape geometry as an annular/donut-shaped geometry around the core heating region. Accordingly, after the core operating mode in which at least one section has been brought to operating temperature, the annular, second heating region can be temperature-controlled. In a third step, a so-called peripheral operating mode is conceivable which extends geometrically around the second heating region. In this context, in each case the battery cells are operated in sections and are temperature-controlled by the heating element, with the result that corresponding heating regions are produced. In the right-parallelepiped-shaped heating region, individual battery cells are therefore connected to one another and temperature-controlled by at least one associated heating element, in such a way that a core heating region (core operating mode), e.g. in the form of a cube, is produced in a first step. In a second step, an intermediate heating region around the core heating region, and in a third step a peripheral region (peripheral operating mode) can be formed around the intermediate heating region. Accordingly, depending on the operating mode or operating strategy, a step-wise partial operating mode of the battery module can be made possible. This permits the different addressability of the individual sections or heating regions by the battery management system. The principle which is applied for this purpose can be compared with an onion shell geometry.

It is also conceivable that the heating elements of the heating regions and/or the number of battery cells of individual sections can be open-loop and/or closed-loop controlled in a temperature-dependent fashion. Open-loop and/or closed-loop controllable temperature control of the sections depending on the temperature level requires little expenditure of energy for pre-heating the battery modules. It is therefore possible to perform open-loop and/or closed-loop control of the heating elements of the heating regions and/or the number of the battery cells of individual sections in accordance with the standby duration of the battery modules, i.e. little to no electrical energy drain and the therefore more rapid cooling of the battery cells. If the battery cells are in a low-temperature range and therefore permit only low power drain, the number of battery cells which can be temperature-controlled by the heating elements can be open-loop and/or closed-loop controlled in a variable fashion. The energy for supplying the heating elements can also be open-loop and/or closed-loop controlled in a temperature-dependent fashion. Accordingly, in the case of a cooled battery module the energy for the heating elements can be increased, and the number of the battery cells of individual sections can be reduced, with the result that said individual sections can be heated more quickly and a partial operating mode is made possible more quickly and/or with higher power. Subsequent to this, the number of heating elements of the heating regions and/or the number of battery cells can be increased, with the result that relatively large heating regions with a relatively large number of battery cells are obtained. However, if the battery cells are already in a temperature operating window which is appropriate in terms of power, less energy is necessary to operate the heating elements. Furthermore, a multiplicity of battery cells can be connected together to form individual sections and combined by the heating elements to form a large heating region, or heating elements in a region which is already temperature-controlled can be switched off.

According to the invention, it can be provided that the heating regions are embodied in layers in the battery module. Correspondingly, the battery module here has a multiplicity of battery cells, wherein these are arranged in layers in the battery module housing. The heating regions can comprise parts or all the battery cells of a layer of the battery module here. It is also conceivable for a plurality of layers of a battery module to be embodied as heating regions, with the result that adjacent sections in the battery module can be temperature-controlled by the heating elements of the heating regions. It is therefore possible for sandwich-like battery modules to be formed by heating regions which are arranged in layers.

According to a second aspect of the invention, at least one battery is claimed for a vehicle which can be at least driven electrically, wherein the battery has a plurality of battery modules according to the invention. It is conceivable here that the battery can also form sections which are combined by heating elements to form heating regions. The individual sections or heating regions of the battery can also be addressed, and therefore temperature-controlled, differently here. Accordingly, parts of the battery and therefore different numbers of battery modules can be temperature-controlled depending on the operating strategy and/or heating mode. This results in all the advantages for the battery according to the invention such as have been described already in relation to the battery module according to the invention.

According to a third aspect of the invention, a method for performing temperature control of a battery according to the invention is claimed, wherein the battery has at least one heating mode, wherein in the heating mode a defined number of battery cells and/or battery modules are conductively connected to one another by means of high-current-conducting connecting elements and can be open-loop and/or closed-loop controlled by a battery management system in such a way that temperature control of the battery is brought about in certain regions. The method for performing temperature control of a battery according to the invention therefore has a multiplicity of battery modules according to the invention, with the result that all the advantages which have already been described in relation to the battery according to the invention and the battery module according to the invention are obtained for the method according to the invention.

BRIEF DESCRIPTION OF THE DRAWINGS

Further measures which improve the invention are apparent from the following description relating to a number of exemplary embodiments of the invention which are illustrated schematically in the figures. All of the features and advantages which proceed from the claims, description or the drawings, including structural details, spatial arrangements and method steps, can be essential to the invention both per se and also in the various combinations. It is to be borne in mind here that the figures only have a descriptive character and are not intended to limit the invention in any form. In the drawings:

FIG. 1 shows a battery module according to the invention in a first embodiment,

FIG. 2a shows a first embodiment of a battery module geometry according to the invention, FIG. 2b shows a further conceivable embodiment of a battery module geometry, FIG. 2c shows a further possible embodiment of a battery module geometry according to the invention, FIG. 3a shows an embodiment of a first heating mode according to the invention, FIG. 3b shows a second embodiment of a heating mode according to the invention, FIG. 3c shows a third embodiment of a heating mode according to the invention.

DETAILED DESCRIPTION

Figure 4:
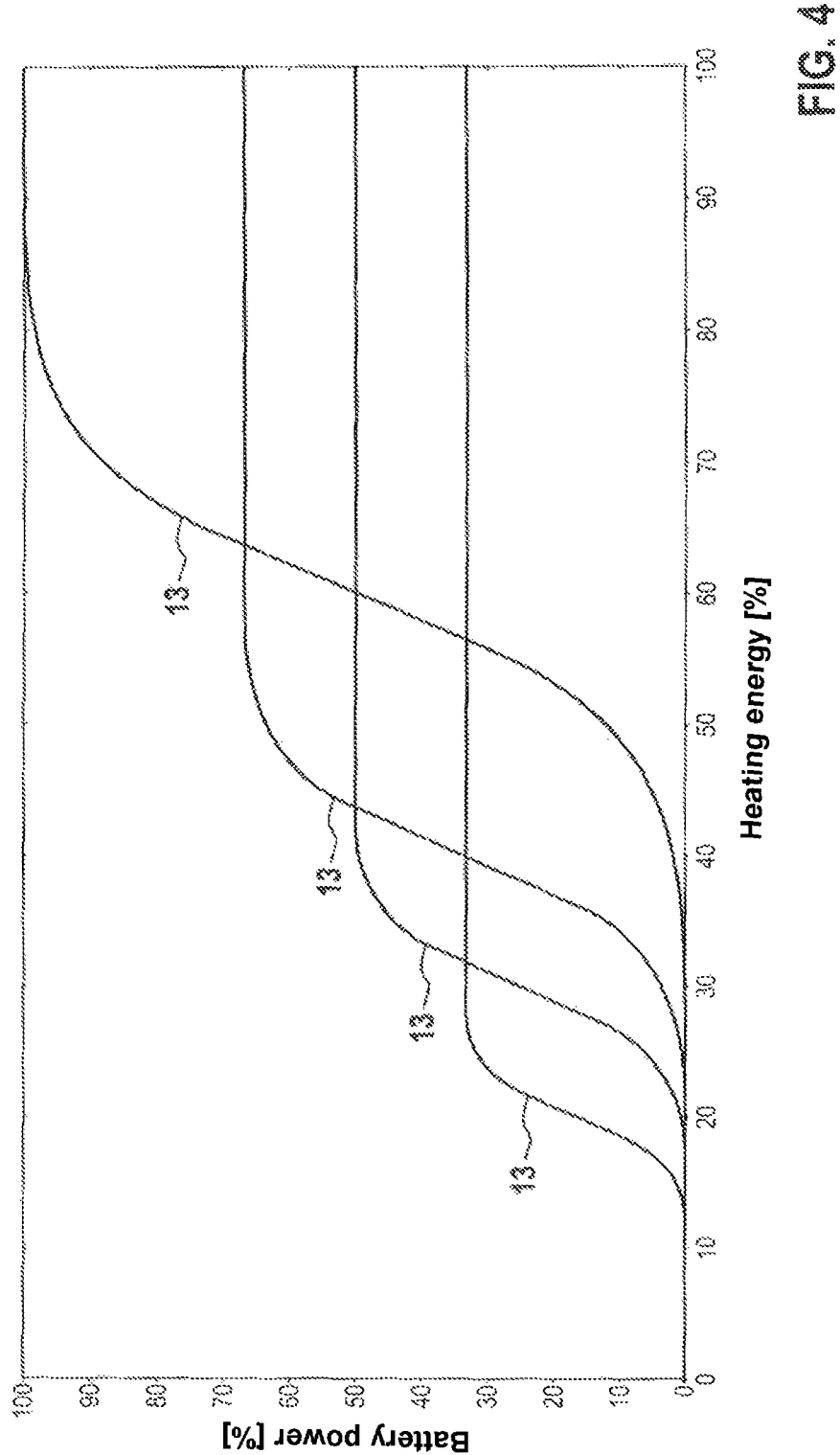
FIG. 4 shows the energy benefit when there is a different number of heated/operated battery cells.

In the following figures, identical reference symbols are used for the same technical features, even of different exemplary embodiments.

FIG. 1 shows a first inventive embodiment of a battery module 10, wherein the battery module 10 has a multiplicity of battery cells 11. The battery cells 11 are connected to one another in series or in parallel by means of high-current-conducting connecting elements 16. The battery module 10 has a module housing 10.1, wherein the battery cells 11 are arranged parallel to one another within the battery module housing 10.1. FIG. 1 shows a section 13 with heating elements 15, with the result that a heating region 14 is formed centrally in the module housing 10.1 of the battery module 10. The heating elements 15 have a signal-transmitting connection here to the battery management system 12. The battery management system 12 also has a signal-transmitting connection to the battery cells 11. The heating elements 15 can be open-loop and/or closed-loop controllable independently of one another via the battery management system 12. The heating elements 15 are arranged here between two battery cells 11, with the result that at least the battery cells 11 can be temperature-controlled along the longitudinal side. The heating region 14 (shown in FIG. 1) of the section 13 comprises six battery cells 11 and has four heating elements 15 which are arranged between the battery cells 11. A further section 13 with a total of eight battery cells 11 is shown in FIG. 1, wherein the second section 13 does not have a separate heating element 15. The second section 13 is arranged here at an edge region of the battery module 10 and is surrounded on at least two sides by the module housing 10.1. According to the invention it is conceivable that the heating region 14 is temperature-controlled in a first step, and subsequently the thermal energy is transmitted to the adjacent battery cells 11, with the result that sections 13 of the battery module 10 can be successively temperature-controlled and therefore made ready for use. According to the invention it is conceivable that the heating elements 15 are embodied here as a heating film 15, a temperature control plate 15 or as a heating wire. In FIG. 1, the heating element 15 is preferably embodied as a heating film or temperature control plate 15 and arranged between the battery cells 11 of the battery module 10. The heating power and the heating duration can be open-loop and/or closed-loop controlled via the battery management system 12, with the result that temperature control of the section 13 can be implemented in certain regions by the respective heating element 15. FIG. 1 also shows that the number of battery cells 11 of the section 13 can be different from one another. For example, the first section 13, which forms the heating region 14, comprises six battery cells 11, and the second section 13 already comprises eight battery cells 11. The heating region 14 is embodied in the form of a right parallelepiped in FIG. 1 and permits a core operating mode of the battery module 10 in which the six battery cells 11 which are arranged in the section 13 are temperature-controlled by the heating elements 15.

FIGS. 2a, 2b and 2c disclose conceivable geometries of the sections 13 of the battery module 10 within the scope of the invention. In FIG. 2a, the section 13 of the battery module 10 has a conical geometry. In FIG. 2b, a right-parallelepiped-shaped geometry of the sections 13 and of the heating region 14 of the battery module 10 is shown. In this context, a heating element 15 is arranged on the battery cells of the heating region 14, wherein the heating element 15 is embodied in the form of a wire here. In FIG. 2c, the section 13 and the heating region 14 are embodied in the cylindrical shape, wherein the section 13 has an edge region and a heating region 14 which is embodied therein in a cylindrical shape. Heating elements 15 are arranged on the battery cells of the battery module 10 in the heating region 14, wherein in FIG. 2c the heating elements 15 are also arranged as heating wires in the battery cells.

FIGS. 3a, 3b and 3c show possible heating modes which are provided according to the invention, wherein the sections 13 and heating regions 14 are embodied in a cylindrical shape here. In FIG. 3a, a heating mode for an intermediate region 14 is illustrated, wherein the heating region 14 is enclosed here by the two sections 13. The first section 13 forms a core region 13, and the second section 13 forms an edge region 13. Only the heating region 14 is temperature-controlled by the heating element 15 here. In FIG. 3b, a core operating mode is shown as a heating mode, wherein the heating region 14 is arranged centrally in the section 13 and is surrounded by a heating element 15. According to FIG. 3b, it is conceivable firstly to embody a core region 14 as a heating region 14 and to perform temperature control thereof via the heating element 15. The thermal energy can subsequently be transmitted at least partially to the sections 13, wherein the battery cells 11 of the heating region 14 can be made operationally ready and adjusted to a corresponding temperature first. FIG. 3c shows a peripheral operating mode as a heating mode, wherein the section 13 is no longer temperature-controlled by a heating element 15 here. Only the outer shell in the form of the heating region 14 is temperature-controlled by the heating element 15. All three heating modes of the FIGS. 3a, 3b and 3c which are shown can be operated successively and/or simultaneously in a desired sequence. Preferably in a first step, a heating mode according to FIG. 3b is to be carried out, followed by the heating mode in FIG. 3a, and subsequently the heating mode in FIG. 3c.

FIG. 4 shows the energy benefit when there is a different number of heated and operated battery cells 11. In this context, the graphic shows the operation of different sections 13, wherein the battery power which is made possible, specified as a percentage on the Y axis, is made possible as a function of the heating energy which is shown on the X axis. The battery module which is illustrated in FIG. 4 is divided here into four sections 13. If the first section 13 is operated with a heating energy level of approximately 25% of the entire heating energy level which is required for temperature control of the battery module 10 completely, the temperature-controlled first section 13 already permits 30% of the battery power. If a further section 13 is then correspondingly temperature controlled and therefore heated to an operationally ready state, 50% of the battery power is already available. When a third section 13 is activated, over 60% of the battery power is already available given a required heating energy level of approximately 50%. If the fourth section 13 is then correspondingly temperature controlled, 100% of the battery power is available. It is therefore apparent that section-wise temperature control of the battery module permits section-wise partial operation. In this context, the energy demand for the heating regions is reduced for the section-wise operation/temperature control. For example a larger range of a vehicle which can be driven electrically can be made possible by virtue of an energy saving as a result of the section-wise open-loop and/or closed-loop controllable temperature control and activation of additional battery cells. The section-wise addressability of the battery cells within the sections 13 permits rapid use of the battery modules and/or of the batteries, for example before the driving mode. At the same time, a low energy demand is necessary for pre-heating, since, as has already been shown in FIG. 4, 30% of the battery power is available if only approximately 25% heating energy is required.

The above explanation of the embodiments describes the present invention exclusively within the scope of examples. Of course, the individual features of the embodiments can, where technically appropriate, be freely combined with one another without departing from the scope of the present invention.

The invention claimed is:

1. A battery module (10) having a multiplicity of battery cells (11), and a battery management system (12) for performing open-loop and/or closed-loop control of the battery cells (11),
wherein the battery cells (11) are combined in sections (13) which each form a heating region (14) and each have at least one associated heating element (15), wherein the heating element (15) is open-loop and/or closed-loop controlled by the battery management system (12) in such a way that temperature control of the sections (13) can be implemented in certain of the heating regions by the respective heating element (15).

2. The battery module (10) as claimed in claim 1, wherein the battery cells (11) of the sections (13) are conductively connected to one another via high-current-conducting connecting elements (16), as a result of which energy for temperature control and/or for the heating element (15) can be transmitted.

3. The battery module (10) according to claim 1, wherein the number of battery cells (11) of the sections (13) are different from one another.

4. The battery module (10) according to claim 1, wherein the heating region (14) is embodied in a conical, right-parallelepiped or cylindrical shape.

5. The battery module (10) according to claim 1, wherein the heating regions include at least one inner heating region (14) and at least one outer heating region (14).

6. The battery module (10) according to claim 1, wherein the heating elements (15) of the heating regions (14) and/or the number of battery cells (11) of individual sections (13) are open-loop and/or closed-loop controlled in a temperature-dependent fashion.

7. The battery module (10) according to claim 1, wherein the heating regions (14) are embodied in layers in the battery module (10).

8. The battery module (10) as claimed in claim 1, wherein the battery cells (11) are solid electrolyte cells.

9. The battery module (10) according to claim 1, wherein the number of battery cells (11) of the sections (13) can be switched in a variable fashion.

10. A battery (100) for a vehicle which is driven electrically, having a multiplicity of battery modules (10) according to claim 1.

11. The battery module (10) according to claim 1, wherein the heating region (14) is embodied in a right-parallelepiped shape.

12. The battery module (10) according to claim 1, wherein in a restricted operating mode, only a single one of the sections (13) or selected ones of the sections (13) is/are temperature controlled by the battery management system (12).

13. A battery module (10) having a multiplicity of battery cells (11), and a battery management system (12) for performing open-loop and/or closed-loop control of the battery cells (11),
wherein the battery cells (11) are combined in individual sections (13) that each have at least one associated heating element (15) to form a heating region (14),
wherein the battery management system (12) is configured to provide temperature control of select ones of the individual sections (13) by controlling the at least one associated heating element (15) for the select ones of the heating regions (14).

14. The battery module (10) according to claim 13, wherein in a restricted operating mode, the battery management system (12) only temperature controls a single one of the heating regions (14) or the select ones of the heating regions (14).

15. The battery module (10) according to claim 13, wherein the number of battery cells (11) of the individual sections (13) are different from one another.

16. The battery module (10) according to claim 13, wherein the number of battery cells (11) of the individual sections (13) can be switched in a variable fashion.

17. The battery module (10) according to claim 13, wherein the heating region (14) is embodied in a right-parallelepiped shape.

18. A battery (100) for a vehicle which is driven electrically, having a multiplicity of battery modules (10) according to claim 13.

19. The battery module (10) according to claim 13, wherein the battery cells (11) of the individual sections (13) are conductively connected to one another via high-current-conducting connecting elements (16), as a result of which energy for temperature control and/or for the heating element (15) can be transmitted.

* * * * *